United States Patent [19]

Beer

[11] E Re. 28,820

[45] Reissued May 18, 1976

[54] METHOD OF MAKING AN ELECTRODE HAVING A COATING CONTAINING A PLATINUM METAL OXIDE THEREON

[75] Inventor: Henri Bernard Beer, Heide-Kalmthout, Belgium

[73] Assignee: Chemnor Corporation, Panama City, Panama

[22] Filed: Aug. 5, 1975

[21] Appl. No.: 602,004

Related U.S. Patent Documents

Reissue of:

[64] Patent No.: 3,864,163
Issued: Feb. 4, 1975
Appl. No.: 237,969
Filed: Mar. 24, 1972

U.S. Applications:

[60] Division of Ser. No. 75,726, Sept. 25, 1970, Pat. No. 3,711,385, which is a continuation-in-part of Ser. No. 549,194, May 11, 1966, abandoned.

[30] Foreign Application Priority Data

May 12, 1965 United Kingdom ..... 20133/65

[52] U.S. Cl. ..... 427/126; 427/115; 427/125; 427/295; 427/375; 427/376; 427/377; 427/399; 427/431; 427/435; 427/436; 204/1 R; 204/35 R; 204/290 F

[51] Int. Cl.[2] ..... B01K 3/04; B44D 1/02

[58] Field of Search ..... 427/115, 126, 295, 375, 427/376, 377, 399, 431, 435, 436; 204/1 R, 35 R, 290 F

[56] References Cited

UNITED STATES PATENTS

| | | | |
|---|---|---|---|
| 2,987,453 | 6/1961 | DuRose | 204/51 |
| 3,055,811 | 9/1962 | Ruff | 204/290 F |
| 3,177,131 | 4/1965 | Angell | 117/230 |
| 3,191,108 | 6/1965 | Boykin | 117/217 |
| 3,213,004 | 10/1965 | Schmidt | 204/35 R |
| 3,254,006 | 5/1966 | Dore | 117/217 |
| 3,254,015 | 5/1966 | Steele | 204/290 |
| 3,282,735 | 11/1966 | Kring | 136/120 |
| 3,357,858 | 12/1967 | Gravey | 117/213 |
| 3,368,919 | 2/1968 | Casale | 117/217 |
| 3,428,544 | 2/1969 | Bianchi | 204/290 F |

*Primary Examiner*—Michael F. Esposito
*Attorney, Agent, or Firm*—Wenderoth, Lind & Ponack

[57] ABSTRACT

A method of making an electrode for use in an electrolytic process. The electrode has a core of a film-forming metal and a layer having at least a part of the outside portion of the thickness thereof of an electrolyte resistant and electrolysis product resistant material, which material contains as the material effective for carrying out electrolysis at least one oxide of at least one platinum metal taken from the group consisting of platinum, iridium, rhodium palladium, ruthenium and osmium. The method comprises forming the platinum metal on the core and then oxidizing it, forming the oxide and then applying it to the core, or forming the oxide directly on the core, for example, by heating a solution of a salt of the metal or electrolysis.

43 Claims, No Drawings

METHOD OF MAKING AN ELECTRODE HAVING A COATING CONTAINING A PLATINUM METAL OXIDE THEREON

Matter enclosed in heavy brackets [ ] appears in the original patent but forms no part of this reissue specification; matter printed in italics indicates the additions made by reissue.

This application *is a reissue of U.S. Pat. No. 3,864,163 which matured from Ser. No. 237,969 which in turn* is a division of application Ser. No. 75,726, filed Sept. 25, 1970, now U.S. Pat. No. 3,711,385, which in turn is a continuation-in-part of application Ser. No. 549,194, filed May 11, 1966, now abandoned.

This invention relates to methods of making electrodes for electrolytic processes, the electrodes comprising a core of a film-forming metal, said core being provided with a thin layer of a non-film-forming material, capable of conducting an electric current from the film-forming core to an electrolyte or vice versa, it being a further requirement for said thin layer, when it is in contact with the electrolyte, to be chemically resistant to the effect of the electrolyte and the products of the electrolysis.

By "film-forming metal" is meant a metal or alloy which, when connected as an anode in the electrolyte and under the conditions in which the metal or the alloy is subsequently to operate as an anode, exhibits the phenomenon that within a few seconds the passage of the electrolysis current drops to less than 1% of the original value. For purposes of this invention, examples of these metals are titanium, titanium alloys, tantalum, tantalum alloys, zirconium, zirconium alloys, niobium, and niobium alloys, and tungsten and tungsten alloys.

By "core of film-forming metal" is meant a body which either consists entirely of the film-forming metal or of a jacket of a film-forming metal filled with a conductive material, such jacket separating the inner material completely from the electrolyte. The core can have any desired shape, such as a preforated or unperforated plane plate, a rod having a cylindrical or rectangular or any other cross-sectional configuration, to increase or decrease the surface area, a straight or curved wire or strand of wires, a wire gauze, or a composite structure of any desired shape.

The term "platinum metal oxide layer" as used throughout the specification and claims should be understood, unless otherwise indicated, to mean a layer containing a single platinum metal oxide or a layer containing a physical mixture of a platinum metal oxide with one or more other platinum metal oxides, or a layer containing a physical mixture of one or more platinum metal oxides with one or more oxides of a metal other than a platinum metal. In the physical mixtures of oxides, the individual oxides are present as discrete particles, except as sintered together or as modified by solid solution penetration of one crystal particle into another in the heat treatment described in the following examples.

Hitherto, a thin layer, as referred to above, on a core of film-forming metal, has mainly been formed of metallic platinum, iridium, rhodium, palladium, ruthenium, osmium, or alloys of these so-called "platinum metals" with each other. This layer, which is generally porous, can be continuous and cover the core entirely, or it can be interrupted and cover the core partially. In all of the prior proposals in this connection, however, irrespective of the manner in which the layers were applied, and irrespective of whether they consisted of a single platinum metal or of an alloy of platinum metals, the metals in the layer were in the pure metallic state and free of chemically combined oxygen.

It has now unexpectedly been found that layers which are chemically much more resistant to both the electrolyte and products of electrolysis are obtained from these platinum metals by using them not in the metallic state, but in the form of their individual oxides, either singly or in mixtures. The electric conductivity of the oxides in relatively thin layers has been found to be virtually equal to that of the corresponding metals.

One use of the electrode made by the methods of the invention is as an anode in electrolytic processes in which current is supplied to the electrolysis apparatus. The electrode comprises a core of a film-forming metal at least partially covered by a layer, at least the outside portion of which layer consists of at least one oxide of a metal of the platinum group, i.e. an oxide of a metal taken from the group consisting of platinum, iridium, rhodium, palladium, ruthenium, and osmium, or mixtures of oxides of these metals. The average thickness of the oxide layer is at least about 0.054 micron. The calculated thickness as set forth hereinafter in the examples is a minimum thickness of the oxide layer. Alternatively, the layer can have the outside portion consisting of a mixture containing at least one oxide of a platinum group metal and at least one oxide of a metal other than a platinum metal, and have the same minimum thickness.

In addition to their chemical resistivity, the oxides and mixtures of the oxides of the platinum metals with each other and with oxides of certain other metals generally have the particular advantage that the threshold value at which they are capable of dissociating an electrolyte is lower than that of the pure platinum metal or an alloy of the pure platinum metals, so that the overall electric energy to be supplied for the electrolytic process is considerably less, which in turn often also avoids undesirable side reactions. This also makes it possible to carry out catalytic reactions at such an electrode. However, the threshold value can be changed as desired by the addition of other oxides of nonfilm forming metals, such as of manganese, lead, chromium, cobalt, and iron. Additions of oxides of film-forming metals such as titanium, tantalum, zirconium, niobium and tungsten can act to raise or lower the threshold value depending on the amount added. Furthermore, the platinum metal oxides, with or without the addition of such other oxides, are considerably more active catalytically than the corresponding platinum metals, thereby providing substantial technical advantages in catalytic and/or electrochemical reactions of organic compounds or in electrolytic processes in an organic medium. An explanation of this effect could be that the active surface area of such an oxide is much larger than that of the corresponding platinum metal, possibly because the oxide may have a capillary structure, resulting in a certain depth of action.

The core of the electrode according to the present invention is a film-forming metal as defined above, i.e. a metal taken from the group consisting of titanium, tantalum, zirconium, niobium, tungsten, and alloys of the metals with each other or with other metals. Where the alloy is with other metals, the alloy must consist predominantly of at least one of said film-forming metals, i.e. the characteristics of the said metal or alloys of said metals determine the behavior of the core in an electrolyte.

The core can be formed from any of the above film-forming metals, but titanium and niobium are preferred if chlorine, either as such or in combination with other products, is a product formed at the anode titanium and niobium being superior to the other film-forming metals for this purpose. The other film-forming metals can be used under oxidizing conditions, particularly in processes in which oxygen is a product of the electrolysis.

Also suitable for the purposes of the present invention, as the core material, are alloys of film-forming metals, for example, titanium with 1–15% molybdenum, titanium with 2% aluminum and 2% manganese, titanium with 0.1–2% copper or titanium with 0.15–1% palladium. Alloys of the same nature can also be formed with tantalum, zirconium and niobium.

Before a film-forming core can be entirely or partly covered with a platinum metal oxide, it will generally be necessary to subject the film-forming metal to a pretreatment to render it better suitable for the application of platinum metal oxides or mixtures thereof with each other or with other oxides, notably the film-forming metal oxides. Such a pretreatment will generally be chemical degreasing, electrolytic degreasing, removal of foreign materials by means of an oxidizing acid, such as nitric acid which does not affect the core, pickling in a non-oxidizing acid, such as hydrochloric acid, oxalic acid or tartaric acid to produce a rough surface, or a treatment with fluorine compounds to produce a smooth surface. Furthermore, to promote the adhesion of the platinum metal oxides, a porous oxide layer can be formed on the core to provide an anchorage for the platinum metal oxides. Such oxide layer can be formed by a suitable treatment of the core in an oxidizing medium, or by means of a direct current and/or alternating current.

After the core has been subjected to any of such pretreatments, if at least such pretreatment is desired, the platinum metal oxide can be applied thereto in various manners, such as:

1. The core can be covered with the desired platinum metal in the metallic state, either galvanically or by the thermal decomposition of a platinum metal compound, or in any other manner. Thereafter the metal can be entirely or partially oxidized to form the oxide thereof. This oxidation can be effected thermally for some of the platinum metals. Ruthenium and palladium can be heated in air, for example, at atmospheric pressure at a temperature of from 300° to 500°C. Iridium and rhodium can be heated in an oxygen containing atmosphere at a temperature of from 600°C and higher, and at a partial pressure of oxygen of at least 300 atmospheres. The oxidation of the metal and the alloys of the metals can also be effected by galvanic oxidation by means of a direct current and/or alternating current, or by a chemical oxidation by means of an oxidant, for example an oxidizing salt melt.

2. The platinum metal oxide or a mixture of oxides of platinum metals can be applied directly to the core. This can be effected by immersing the core in the molten oxide or oxide mixture provided that the conditions are such that the platinum metal oxides concerned do not dissociate. Other ways are by dispersing the oxide or mixture of oxides in a liquid carrier such as alcohol or water, and depositing this onto the core by electrophoresis; by spraying the oxide or mixture of oxides onto the core at an elevated temperature and/or pressure; by brushing or painting the core with a dispersion of the oxide or mixture of oxides in an instable carrier followed by firing; or by contacting a grounded core with electrostatically charged oxide or mixture of oxides at room temperature followed by baking. Generally speaking, the application of the oxide or mixture of oxides directly to the core will be effected under oxidizing conditions. The platinum metal oxides or mixtures thereof, or mixtures of the platinum metal oxide with oxides of other metals can also be applied directly to the film-forming metal core by immersing one or two of such cores connected to a source of current in a solution of a platinum metal salt, a mixture of platinum metal salts or a mixture of platinum metal salts with salts of other metals, and passing a direct or an alternating current or a combination of the two through the immersed electrodes for some time.

3. The platinum metal oxide or the mixture of platinum metal oxides can also be formed on the core in situ from one or more platinum metal compounds, for example, by heating, a chemical reaction, or electrochemical reaction.

It is included within the scope of the present invention to cover the core of film-forming metal with a platinum metal or alloy of platinum metals, and to oxidize only the outer part of the layer, e.g. 5–25% of the thickness of the layer. Also, the oxides of the platinum metals can be admixed with other oxides. It is highly beneficial to use oxides of other than platinum metals, which oxides are difficult to reduce or refractory, such as the oxides of the film-forming metals, or other oxides such as chromium and silicon oxides. Such oxides are generally added in quantities up to 50% by weight of said platinum metal oxide, preferably 1–25% by weight, to prevent reduction of the platinum metal oxide.

The advantages of the use of platinum metal oxides instead of platinum metals in the metallic state are the following:

a. The oxides have a greater resistance to products of electrolytic processes than the metals. For example, in alkali metal chloride electrolysis, a core of a film-forming metal coated with metallic palladium or ruthenium loses more than 50 g of metal per ton of chlorine produced. When the core is coated with palladium oxide or ruthenium oxide, the loss is less than 0.5 g per ton of chlorine produced.

b. As a result of the greater resistance of the platinum metal oxides, the electrodes can be used in processes for which the platinum metals themselves are unsuitable.

c. The platinum metal oxides can be more easily applied in properly adhering layers than the platinum metals.

d. The platinum metal oxides, by themselves or in combination with other oxides, have a better resistance to contact with mercury or amalgam than the platinum metals so that the electrode of the present invention can also be used in cells in which such contact is inevitable.

e. As a result of the greater resistance, the platinum metal oxides can be applied in thinner layers than the platinum metals, resulting in great technical and economic advantages.

f. Contrary to the platinum metals themselves, the platinum metal oxides have a "depth effect," i.e. an effect connected with the greater porosity of the coating which the platinum metal oxides form, so that electrodes having an extra catalytic activity become possible.

These advantages are also obtained by the use of mixtures of platinum metal oxides and oxides of other metals.

The electrodes according to the present invention are provided with one or more terminals for electric leads, either before or after the platinum metal oxide or oxides have been applied.

Some examples of anodes covered with single platinum metal oxides or mixtures of oxides of the platinum metals with each other or with oxides of metals other than platinum metals for specific purposes will be described hereinafter.

In some of the following examples, certain ranges are mentioned for the heating periods and temperatures to form oxides. Such ranges, however, are not intended to limit the invention in any way. Within these ranges good results have been obtained in practice, but generally speaking, the advantages of the invention can also be realized outside of these ranges. The heating periods and temperatures to be selected within the ranges mentioned depend on the desired thickness of the layer of oxide, the desired aging of the oxide, the desired crystal structure and the like. Generally speaking, a long heating period within the temperature ranges mentioned will be advantageous.

If the platinum metal oxide layers is formed in situ by the oxidation of the platinum metal, it will generally be contaminated with a smaller or larger content of the free metal, depending on the manner in which the oxide layer is formed, so that the exact chemical composition of the oxide is difficult to determine. Insofar as, in the following examples, certain platinum metal oxides are designated by name or by a formula, such designation is intended as an approximation of the composition which is considered most probable.

In the following examples, where thickness of the deposited layer is referred to, reference is to average thickness. The actual thickness at any point on the surface may vary somewhat from this average.

EXAMPLE 1A

A plate of commercial grade titanium having the dimensions 20 × 20 × ⅛ inches is subjected to a pretreatment comprising decreasing, pickling in 10% oxalic acid at 95°C, and rinsing with demineralized water.

A mixture comprising a platinum metal compound is applied to the core by a series of painting or brushing steps onto both sides of the core with intermediate heating. Said compound is one which, when heated, is directly converted to the desired oxide, i.e. without intermediate reduction to the metal. One example of such a mixture is the following 4.5 cc isopropyl alochol
0.1 cc 36% hydrochloric acid
0.5 g palladium chloride (40% by weight Pd).

After each coating step with this solution, the core is heated at 400° – 500°C for about 10 minutes in an oxidizing atmosphere, for example, air, and all of the compound is converted to directly from a layer of palladium oxide in the desired form and in properly adherent condition. The calculated thickness of the layer is about 0.054 micron. The adherence can be further improved by subsequent heating in the same temperature range for 1 – 60 hours.

The adherence of oxide films can be improved by first applying to the core of the film-forming metal a porous layer of oxide of the film-forming metal, for example, by connecting the core in an electrolyte alternately as an anode and as a cathode, or by heating in an oxygen containing atmosphere, whereafter a platinum metal oxide layer will adhere very well to the oxide layer thus formed. This is particularly beneficial for oxide layers of a thickness of from 1 – 10 microns. Electrodes thus obtained are suitable for the electrolysis of chloride containing solutions in contact with organic compounds, or for the normal alkali metal chloride electrolysis.

EXAMPLE 1B

If a platinum metal layer is first applied to the core, the same can also be oxidized electrolytically. Thus, a core pretreated in the manner described above in Example 1A, and electrolytically or thermally provided with a platinum metal coating, is connected as an anode in an electrolyte consisting of 1–80% sulphuric acid at room temperature, whereafter a combination of direct current and alternating current, with a voltage of about 2 – 6 volts and a current density of 1 – 50 mA/cm$^2$ is passed through the electrolysis apparatus for 10 – 80 hours. Thereafter the anode is thoroughly rinsed in water and heated in air at 110° – 240°C for at least 3 minutes. Alternatively any acid which will supply oxygen can be used in place of the sulphuric acid. This treatment can also be carried out at an elevated temperature, for example, at 50° – 60°C, in which case the duration of the electrolysis can be considerably shortened and/or a lower acid concentration can be used. The electrodes can be spaced apart a distance of 2 – 50 mm. During this treatment the platinum metal on the core will be oxidized to a platinum metal oxide.

EXAMPLE 1C

Another possibility is the chemical oxidation of the platinum metal. A titanium core as described above in Example 1A is thoroughly degreased, for example, by means of petroleum ether or carbon tetrachloride, dried at about 80°C, subsequently picked in a mixture of 10% hydrochloric acid and 10% oxalic acid, and then dabbed with 5% nitric acid, whereafter there is brushed onto the surfaces of the core a mixture of:

100 cc of isopropyl alcohol
10 gm of platinum chloride (4% by weight Pt)
10 cc of lavender oil.

The thus coated core is carefully heated in an open flame until the entire surface to which the solution was applied is coated with platinum metal. Subsequently, the thus plated core is immersed in a melt of sodium and/or potassium nitrate at a temperature of 400° – 600°C for from 1 – 60 minutes while passing a mixed alternating and direct current therethrough until platinum metal oxide has been formed thereon. For shorter times and lower temperatures less than all of the thickness of the platinum metal will be oxidized, while by using longer times and higher temperatures, the entire thickness can be oxidized.

EXAMPLE 1D

The oxidation of the platinum metals ruthenium and palladium can also be carried out at elevated pressure. For example, a core as described above in Example 1A is coated with a ruthenium metal salt and reducing agent containing solution similar to that described in Example 1C. The core is then introduced into an oxygen containing atmosphere having an oxygen partial pressure of 0.2 – 25 atm. and heated at a temperature of 225° – 500°C or higher for a period of 1 – 30 hours until the outer part of the ruthenium layer is oxidized or the whole thickness is oxidized. Alternatively, the plating can be carried out by any conventional plating step, such as electroplating.

EXAMPLE 1E

Cores of tantalum or titanium like the core of Example 1A and pretreated in the same manner can be coated with platinum metal oxides in layers of 0.5 – 50 microns by placing two cores as the two electrodes in an aqueous solution of 5 g platinum chloride and 5 cc 36% hydrochloric acid in 1000 cc water of a temperature of 75°C, and supplying to these cores an alternating current of 4–8 volts with a current density on the cores of 50 – 500 mA/cm$^2$. After about 10 minutes there has then formed on the two electrodes a strongly adhering platinum oxide layer which in combination with the core is an excellent anode for the electrolysis of aqua regia, sulphuric acid and alkalis.

Titanium and tantalum cores coated with a platinum metal oxide, obtained by the above described methods of Examples 1A – 1E, are very suitable for use as anodes in the electrolysis of alkali metal chlorides, both in aqueous and in non-aqueous mediums, the oxides $PtO_2$ and $RuO_2$ being preferred as being much more resistant to nascent chlorine, which is formed in such chloride electrolysis, then metallic platinum or ruthenium, which, unlike the oxides, is dissolved under these conditions.

EXAMPLE 2A

A core of normal commercial titanium can be degreased by means of any of the compositions commercially available for the purpose, followed by electrolytic degreasing in a standard bath, whereafter the core is rinsed and placed in a 5% nitric acid solution to remove foreign metals, such as iron, from its surface. Thereafter, the core is again rinsed and pickled for 5 hours in an aqueous oxalic acid solution to which a chlorine compound, such as ammonium chloride, has been added. Subsequently the core is rinsed and then again placed in 5% nitric acid, whereby the impurities present in the titanium, such as iron and copper, are removed from the freshly pickled surface. After about 0.5 hour, the core is rinsed well and dried at 50°C. Subsequently, platinum dioxide is sprayed onto the core by means of a plasma burner, and an excellent adherence is obtained.

EXAMPLE 2B

It is also possible to apply a platinum oxide coating to the core by coating the core with a dispersion of the oxide in a carrier. For this purpose there is first prepared a platinum dioxide dispersion by mixing 5 g finely divided $PtO_2$, e.g. particles having a size less than 1 micron, in 1 liter of a mixture of water and alcohol, which acts as the carrier, whereafter the dispersion thus obtained is applied to a titanium core prepared according to Example 1A by brushing or spraying. The core thus coated is dried to remove the carrier, and the coated core is then baked at a temperature of at least 160°C in an oxygen containing atmosphere at an oxygen partial pressure of 0.2 atm. for at least 5 min. Thereafter the core is cooled at the same pressure whereby the platinum dioxide is left on the core metal in a properly adhering condition. The calculated thickness of the layer of platinum dioxide is about 0.95 micron.

The core to which the dispersion of the platinum oxide in a mixture and alcohol is applied is preferably first provided, either thermally, chemically, or galvanically, with an extremely thin layer of porous titanium oxide in which the platinum oxide can anchor itself. After the platinum oxide has been applied to this oxide layer, the coated core is preferably subjected to a thermal treatment under pressure to enable any amorphous oxides to be converted into crystalline oxides so that an ideal adherence of the platinum oxide to the core is obtained.

Another method of anchoring the platinum oxide is the use of at least partially porous titanium, provided the porosity is not so high as to inhibit the formation of a barrier layer under anodic conditions. The porosity of titanium can be reduced, after the application of the dispersion and the drying, by rolling, which improves the anchorage of the platinum oxide embedded in the porous titanium.

The titanium cores coated with platinum oxide manufactured in accordance with Examples 2A and 2B are very suitable for use as anodes under the same conditions as described in Examples 1A – 1E, and also for purposes of cathodic protection.

EXAMPLE 3

A core of commerically pure titanium is degreased and pickled in the manner described in Example 1A and dried in air at 120°C. Subsequently ruthenium oxide ($RuO_2$) is applied to the thus pretreated core electrophoretically in the following manner.

Ruthenium chloride is dissolved in a mixture of equal parts of water and alcohol. Then the solution is alkalized, e.g. to pH 9 by means of ammonia, to form a sol of extremely finely divided ruthenium oxide. In this sol there are placed two of the pretreated titanium cores or one of the pretreated titanium cores with another electrode of a material which acts as a cathode, and a direct current is passed through the electrodes. The electrophoresis which then occurs causes extremely finely divided particles to be deposited from the sol onto the electrode. By careful drying and heating, an excellently adhering layer is obtained.

It is also possible to deposit a mixture of platinum metal oxides onto the core by dissolving salts of the desired platinum metals in the desired quantities, making a sol of the solution thus obtained in a known manner and depositing these precipitated particles on the core by electrophoresis. The precipitated particles are converted to oxides by careful drying and heating.

A sol can also be made by combining the platinum metal oxides in the desired quantities with oxides of other metals such as manganese or lead, whereafter the platinum metal oxides, together with the other metal oxides, are deposited on the core by electrophoresis.

In each instance of electrophoretic deposition the deposited coating should be carefully dried and heated to promote adherence. Titanium cores thus coated can be used for a large diversity of electrolytic processes, it being possible to render the overvoltage either high or low by the selection of the quantity and the nature of the oxides of the metals other than the platinum metals.

Electrodes thus obtained are suitable for use in the electrolysis of metal chlorides, both in aqueous and in non-aqueous media for cathodic protection, and for use in the galvanic industry.

Ruthenium oxide has a greater chemical resistance than ruthenium and in addition requires less energy for effecting the desired reaction in an electrolytic process.

EXAMPLE 4

A core of commercial grade titanium is degreased and subsequently pickled in a solution of a fluorine compound, for example, 80 parts by weight of water, 18 parts of nitric acid, and 2 parts of sodium fluoride. After the pickling, the titanium has a very smooth, almost polished surface.

A dispersion of ruthenium oxide in water is prepared by means of a non-ionic moistener, for example, an ethylene oxide condensation product. This dispersion is painted onto the pretreated core, whereafter the core thus painted is carefully dried. Then the ruthenium oxide present on the surface is forced into the surface of the core by hammering or pressing, which produces an electrode which is mechanically very strong, and is excellently suited for cathodic protection of objects in sea water and other surroundings where the electrode is subjected to mechanical wear by contact with objects such as floating logs and the like.

This electrode is also excellently suited for use in electrolytes containing non-dissolved salt particles, or electrolytes in which salt particles are deposited on the electrode, which is apt to cause excessive mechanical wear.

EXAMPLE 5

A tube of practically pure tantalum, having a diameter of 150 mm, a length of 1500 mm, and a wall thickness of 1 mm, and which is closed on one end, is pretreated by degreasing, for example, by means of petroleum ether or carbon tetrachloride and is then pickled. The tube is galvanically coated with ruthenium in a known manner. After this the tantalum, coated with ruthenium, metal is heated in an oven in air at temperatures between 450° and 600°C for 3 hours, whereby more of the ruthenium-metal is converted into the oxide. (In general 1 micron of ruthenium-metal is for the largest part converted into the oxide in 6 hours at a temperature of 550°C in air). The formed coated core is then filled with a melt consisting of 50% lead and 50% bismuth, whereafter the filled core is cooled.

Alternatively tantalum can be thermally coated with ruthenium oxide in the following manner: A piece of tantalum sheet is pretreated, etched etc. in the usual way and after this painted several times with a mixture of 1 gr. $RuCl_3$ (which contains 40% Ru metal)

4 cc isopropylalcohol 1.3 cc linalool.

After each treatment the sheet is dried in air for 10 minutes and heated in an oven in air at 450°C for 10 minutes. This treatment is repeated a sufficient number of times until the desired thickness of the layer is reached. Each coating of the above mixture on an etched tantalum surface will give a thickness calculated to be about one twenty-fourth of a micron. After the last coating the tantalum sheet is heated for 1 hour in a reducing atmosphere at 450°C to convert all the deposited ruthenium to the metal. To convert this ruthenium metal for the largest part to the ruthenium oxide, the coated tantalum is heated for 60 hours in air at temperatures between 450° and 600°C.

The anode produced by this treatment is exceptionally suitable for the electrolyses of brine, and other chlorine containing electrolytes at high current densities with a very low overvoltage and low losses of active surface per amphour.

A solid core of tantalum can be treated in a similar manner.

A titanium sheet can be used in place of tantalum.

It is also possible to use a core obtained by coating a body of a non-film-forming metal, for example copper with a film-forming metal, such as titanium or tantalum, by applying this metal to the body by galvanization, spraying, or by a technique using an explosion in which the film-forming metal plate is laid on a base body and an explosion is caused adjacent the film-forming metal plate, driving it against the base body.

EXAMPLE 6

A rod-shaped core of commercially pure zirconium having a diameter of 2.5 cm and a length of 50 cm is thoroughly degreased, for example, by means of petroleum ether or carbon tetrachloride, dried, and subsequently blasted with zirconia. Then there is painted or brushed onto the surface a mixture comprising:

10 g isopropyl alcohol 5 g linalool (coriandrol)

2 2 g platinum chloride (40% by weight Pt)

2 g palladium chloride (40% by weight Pd).

The core thus coated is heated in air and at a temperature of 600° – 1000°C for a period of 0.25 – 10 hours. The dissolved platinum and palladium salts will be decomposed to a platinum and palladium alloy.

The metallic platinum and palladium alloy is oxidized to a mixture of oxides in a salt melt of sodium and/or potassium nitrate having a temperature of 300° – 850°C for at least 10 minutes while passing a mixed alternating and direct current therethrough. Longer times and temperatures at the upper end of the range will produce more complete oxidation. The completely oxidized layer will have a thickness calculated to be about 5.2$\mu$.

A zirconium core coated with a mixture of platinum and palladium oxides can be very satisfactorily used as an anode in practically all acids or in aqueous or alcoholic solutions of such acids, and is much more suitable for these uses than a core coated with an alloy of metallic platinum and palladium. The oxides are preferred to the metal because they are much more resistant to the action of the acids.

The electrode thus obtained is particularly suitable for the preparation of perborates.

EXAMPLE 7

A plate-shaped core of commercially pure niobium having the dimensions 150 × 150 × 0.1 cm, is thoroughly degreased by means of, for example, carbon tetrachloride and acetone 50/50 and dried. Subsequently there is applied to both sides of the core, by brushing or painting a mixture of:

100 cc of isopropyl alcohol 10 gm of palladium bromide (40% by weight of Pd)

10 cc of anise-oil.

The core thus coated is heated in air at 400° – 750°C for 0.5 – 10 hours. The dissolved palladium salt is decomposed to palladium. The palladium coated core is then immersed in a salt melt of sodium and/or potassium nitrate having a temperature of 300° – 850°C for at least 10 minutes while passing a mixed alternating and direct current therethrough to oxidize the palladium to palladium oxide.

A niobium core coated with palladium oxide is excellently suited for use in alkaline solutions and for chlorine electrolysis. The oxide is considerably more resistant to the action of alkaline solutions or of chlorine than metallic palladium.

EXAMPLE 8

A titanium core pretreated in the manner described in Example 1A is coated on both sides by brushing or painting with a mixture of:

100 cc of isopropyl alcohol
10 cc of iridium chloride (40% by weight Ir)
2 gm of manganese oxalate (38% by weight Mn).

The core thus coated can be heated in an atmosphere having an oxygen partial pressure of 1 – 10 atmospheres at a temperature of 200°–750°C preferably 400° – 525°C for 10 – 60 minutes, the salts being directly converted to the oxides.

The titanium core coated with iridium and manganese oxides can be used as an anode for the electrolysis of chlorine containing solutions such as hydrochloric acid, brine, zinc chloride, and of sulphuric acid solutions and the like, and has a chemical resistance far superior to that of a core coated with metallic iridium. Consequently the layer of oxides can be considerably thinner than a layer of the corresponding metals to obtain the same chemical resistance, while the same quantity of electrical energy can be transmitted.

The anode thus obtained is particularly suited for the preparation of per-compounds.

EXAMPLE 9

A titanium core is pretreated in the same manner as described in Example 1A. A solution consisting of:

30 cc of isopropyl alcohol;
10 cc of linalool (coriandrol);
2 gm of palladium chloride (about 40% by weight Pd); and
2 gm of platinum chloride (40% by weight Pt)

is applied to both sides of the titanium core by means of a brush or by spraying, whereafter the core thus coated is heated in the air at 300° – 400°C. and subsequently at 450° – 480°C in an atmosphere consisting of a reducing gas admixed with ammonia or a volatile amine.

If so desired, this treatment is repeated until the desired thickness of the layer has been obtained.

There is thus produced a titanium core coated with a platinum-palladium alloy.

Two cores coated in this manner are placed in a 1% aqueous $H_2SO_4$ solution and alternately connected as an anode and as a cathode, such as by connection to a source of alternating current, at a current density of 1 – 10 mA/cm$^2$ at room temperature, as a result of which treatment the platinum metals are converted into the corresponding oxides.

EXAMPLE 10

A tantalum core of the same size as that of Example 5 is pretreated in the manner described in Example 5, whereafter there is formed on the surface of the core a layer of a mixture containing 90% palladium oxide and 10% iridium oxide. The mixture is applied as follows:

1 g palladium chloride (40% by weight Pd), 0.1 g iridium chloride (40% by weight Ir), and 1 cc 36% hydrochloric acid are dissolved in 10 cc isopropyl alcohol. This mixture is applied to the tantalum core by painting, dipping or spraying. To obtain a better adherence, the tantalum core is preferably provided with an extremely thin layer of tantalum oxide in a manner known per se, for example, electrolytically, or by heating in n oxygen containing atmosphere, for example air, whereafter the solution is easily absorbed in the layer of tantalum oxide. By simple heating in the air at 300° – 600°C for a period of 2 or 3 minutes to 1 hour the desired mixture of these oxides is directly formed on the tantalum surface and adheres well. The layer is calculated to be about 0.099 micron thick.

It is also possible to deposit the mixture of the oxides directly onto the tantalum core by means of electrophoresis from a solution in the following manner:

1 g palladium chloride (40% by weight Pd) and 0.1 g iridium chloride (40% by weight iridium) are dissolved in 100 cc of water. By blowing ammonia gas into the solution of these salts are precipitated as hydroxides, which can be dehydrated in a known manner, for example, by boiling and adding an oxidant if necessary. In some cases, particularly if a sol of a higher concentration is desired, the addition of a protective colloid may be necessary to enable the sol to be kept and used for longer periods of time. By connecting a tantalum core as an electrode in the sol and applying an electric voltage for some seconds to some minutes, a dense layer of the precipitated oxides is caused to adhere to the tantalum core, which layer can be made to adhere to the core very well by careful drying and subsequent heating. In this case it is recommended that the tantalum core be previously superficially oxidized.

The tantalum core coated with the palladium and iridium oxides thus obtained is excellently suited as an anode in the electrolysis of aqueous solutions of potassium or sodium chloride, e.g. brine, and has a lower overvoltage and a greater chemical resistance than a core coated with an alloy of the corresponding metals.

EXAMPLE 11

A niobium core is pretreated in the manner described in Example 7 and coated with a mixture of 50% rhodium oxide and 50% iridium oxide in the following manner:

Rhodium and iridium salts are dissolved in water in the desired ratio and precipitated by means of a base, such as NaOH, whereafter the mixture is converted into the oxides by means of an oxidant, such as oxygen gas. Subsequently the precipitated oxides are filtered, dried, and, if desired, brought into the desired oxidation state. The mixture of oxides thus obtained is milled or finely-divided in any other manner, and then dispersed in a liquid carrier, such as ethanol, whereafter the dispersion is applied to the niobium core by means of a brush or by dipping the core into the dispersion, and is carefully dried. The mixture of oxides is then embedded in the surface of the niobium by hammering, pressing, or subjecting the core to any other form of pressure, or by means of ultrasonic vibrations.

The niobium core thus coated with a mixture of rhodium and iridium oxides is excellently suited for the electrolysis of hydrochloric acid, nickel salt solutions, chromic acid solutions, and for the preparation of chlorates and per-chlorates.

EXAMPLE 12

A core of titanium containing 4% molybdenum is pretreated in the manner described in Example 1A, whereafter a mixture of 90% platinum oxide and 10% manganese dioxide is applied to the surface of the core.

The mixture of platinum oxide and manganese dioxide can be applied to the core by any of the methods mentioned hereinbefore, for example, by burning in from a solution, by electrophoresis from a sol, mechanically, for example, by pressure, but also by placing the core in an electrolyte containing a solution of the salts of the metals in the desired ratio, connecting the core to the negative pole of a source of direct current while employing an inert material as the anode, for example platinized titanium, the desired alloy of platinum and manganese being deposited on the core from the electrolyte by the direct current, and converting the alloy into the oxides, for example, by galvanic oxidation.

A titanium core pretreated in a similar manner is coated with a mixture of 95% platinum oxide and 5% silicon dioxide, which may be effected in the following manner:

The titanium core is degreased and provided with a thin film of oxide by heating in the air at 400°C for 0.5 hour. Subsequently a dispersion of 95 parts by weight of $PtO_2$ and 5 parts by weight of $SiO_2$ in a liquid carrier, such as pure water, which dispersion can be stabilized by means of a protective colloid, is applied to the core by brushing or dipping, and dried. If so desired, this treatment is repeated until the desired quantity of $Pto_2$ and $SiO_2$ has been applied to the surface of the titanium core. The thus treated core is heated for 5 – 300 minutes at 800° – 1100°C under mildly oxidizing conditions. During this heating, the platinum oxide and the silicon oxide are baked or sintered to the titanium surface so that a very strong adherence is obtained. The adherence of platinum metal oxide to metallic titanium by baking or sintering is not only improved by the addition of silicon oxide, but also by the addition of substances such as titanium hydride, zirconium oxide and/or other so-called refractory oxides.

A titanium core pretreated in a similar manner is coated with a mixture of platinum oxide and chromium oxide in the following manner.

A solution of 5 g platinum chloride and 2 g ammonium dichromate in ethyl alcohol is applied to the titanium core by painting or spraying, and dried at 120°C. If so desired, this treatment is repeated until the desired thickness has been obtained. Subsequently, the thus coated core is heated at 460° – 480°C in oxygen under a pressure of 8 – 15 atmospheres to form platinum and chromium oxides directly.

The electrode thus obtained is particularly resistant and, inter alia, extremely well-suited for use in a galvanic bath containing small quantities of fluorine.

The titanium cores coated with mixtures of platinum oxide and another metal oxide can be used under the same conditions as the electrodes described in Examples 1 – 4, 8 and 9.

EXAMPLE 13

A rod of tungsten is sandpapered, electrolytically degreased and after this, painted with a solution of 1 gr. $RuCl_3$ (which contains 40% Ru metal) in 5 cc isopropylalcohol. The coated rod is dried in the air for 10 minutes and after this is heated in an oven in air at 300°C for 10 minutes. This treatment is repeated 5 times. After this treatment the coated rod is heated again in an oven in air for an hour at 450°C. The rod is thereby coated with a layer of ruthenium oxide. This is proven by exposing the coated rod to Aqua Regia, to which the layer is resistant. (Ruthenium metal is not resistant to Aqua Regia.) The tungsten rod coated in this way with ruthenium oxide is an excellent anode for the electrolyses of brine, hydrochloric acid etc. at low power-consumption and has a very low-voltage for chlorine and has very little weight loss of ruthenium oxide per ton of chlorine.

What is claimed is:

1. A method of making an electrode comprising forming on at least part of the surface of a core of a film-forming metal a layer containing at least one platinum metal taken from the group consisting of platinum, iridium, rhodium, palladium, ruthenium, rhenium and osmium, and alloys of these metals, the amount of platinum metal being sufficient, when converted to the oxide thereof, to be effective for carrying out electrolysis, and subjecting the layer to oxidizing conditions which are sufficient to oxidize the metal of said layer until the layer is oxidized to a depth of at least about 0.054 micron.

2. A method as claimed in claim 1 in which the core metal is a metal taken from the group consisting of titanium, tantalum, zirconium and niobium and alloys of said metals.

3. A method as claimed in claim 2 comprising oxidizing said core metal for forming an oxide layer on said core metal prior to applying the oxide of the platinum metal.

4. A method as claimed in claim 3 in which the oxide layer is formed on the core metal thermally.

5. A method as claimed in claim 1 in which the step of subjecting the layer to oxidizing conditions comprises applying to it a melt of an oxidizing salt.

6. A method as claimed in claim 5 in which the core is titanium, the metal of the layer is platinum, and the step of subjecting the layer to oxidizing conditions comprises immersing the core having the layer of platinum thereon into a melt of a material taken from the group consisting of sodium nitrate and potassium nitrate.

7. A method as claimed in claim 5 in which the core is zirconium, the metal of the layer is an alloy of platinum and palladium, and the step of subjecting the layer to oxidizing conditions comprises immersing the core having the layer thereon into a melt of a material taken from the group consisting of sodium nitrate and potassium nitrate.

8. A method as claimed in claim 5 in which the core is niobium, the metal of the layer is palladium, and the step of subjecting the layer to oxidizing conditions comprises immersing the core having the layer thereon into a melt of a material taken from the group consisting of sodium nitrate and potassium nitrate.

9. A method as claimed in claim 1 in which the platinum metal is taken from the group consisting of ruthenium and palladium, and the step of subjecting the layer to oxidizing conditions comprises heating it in an oxygen containing atmosphere.

10. A method as claimed in claim 9 in which the core is titanium and the metal is ruthenium, and the step of heating in an oxygen containing atmosphere comprises heating in an oxygen containing atmosphere having a partial pressure of oxygen substantially equal to that of air.

11. A method as claimed in claim 9 in which the core is tantalum and the metal is ruthenium, and the step of heating in a oxygen containing atmosphere comprises heating in air.

12. A method as claimed in claim 11 in which the step of forming the metal layer comprises applying to the core a solution of a salt which when heated will form on the core the metal, and then heating the core to form the metal.

13. A method as claimed in claim 1 in which the step of subjecting the layer to oxidizing conditions comprises heating it in an oxygen containing atmosphere which has a partial pressure of oxygen greater than the partial oxygen pressure of atmospheric air.

14. A method as claimed in claim 13 in which the core is titanium with 4% molybdenum, the step of forming the metal layer comprises applying to the core a solution of a salt of platinum which will form platinum when heated, and then heating the core to form platinum, and the step of heating in an oxygen containing atmosphere comprises heating in oxygen at a pressure of 8–15 atmospheres.

15. A method of making an electrode comprising forming a material containing as a substance effective to carry out electrolysis at least one oxide of a platinum metal taken from the group consisting of platinum, iridium, rhodium, palladium, ruthenium, rhenium and osmium, and alloys of these metals, and applying the material to at least a part of the surface of a core of a film-forming metal to form a layer on said part of the surface of the core, which layer is at least 0.054 micron thick.

16. A method as claimed in claim 15 in which the core metal is a metal taken from the group consisting of titanium, tantalum, zirconium and niobium and alloys of said metals.

17. A method as claimed in claim 16 comprising oxidizing said core metal for forming an oxide layer on said core metal prior to applying the oxide of the platinum metal.

18. A method as claimed in claim 17 in which the oxide layer is formed on the core metal thermally.

19. A method as claimed in claim 15 in which the step of forming the material comprises melting a platinum metal oxide under pressure, and the step of applying the material to the core comprises applying the molten oxide to the core and then cooling the thus-coated core.

20. A method as claimed in claim 15 in which the step of forming the material comprises preparing a hot melt of the platinum metal oxide, and the step of applying the material to the core comprises spraying the hot melt onto the core.

21. A method as claimed in claim 15 in which the step of forming the material comprises forming a dispersion of the platinum metal oxide in a liquid carrier which is a liquid which can be evaporated without leaving any residue, and the step of applying the material to the core comprises contacting the core and the dispersion.

22. A method as claimed in claim 21 in which the step of applying the material comprises spraying the dispersion onto the core.

23. A method as claimed in claim 21 in which the step of applying the material comprises brushing the dispersion onto the core.

24. A method as claimed in claim 21 in which the step of applying the material comprises dipping the core into the dispersion.

25. A method as claimed in claim 21 in which the core is titanium and the dispersion is a dispersion of platinum oxide.

26. A method as claimed in claim 21 in which the core is niobium and the dispersion is a dispersion of rhodium oxide and iridium oxide.

27. A method as claimed in claim 21 which further comprises, after the dispersion is applied to the core, applying pressure to the dispersion for adhering the dispersion to the core.

28. A method as claimed in claim 15 in which the step of forming the material comprises preparing a plasma of the platinum metal oxide, and the step of applying the material to the core comprises spraying the plasma onto the core.

29. A method as claimed in claim 28 in which the core is titanium and the oxide is platinum dioxide.

30. A method as claimed in claim 15 in which the step of forming the material comprises preparing a dispersion of a platinum metal oxide and an oxide of a metal other than platinum in a liquid carrier which is evaporated without leaving any residue, and the step of applying the material to the core comprises contacting the core and the dispersion.

31. A method as claimed in claim 30 in which the core is 4% molybdenum and the balance titanium, and the platinum metal oxide is platinum oxide and the oxide of a metal other than platinum is manganese dioxide.

32. A method as claimed in claim 30 in which the core is titanium and the platinum metal oxide is platinum oxide and the oxide of a metal other than platinum is silicon dioxide.

33. A method of making an electrode comprising forming a solution of a material containing a salt of at least one platinum metal taken from the group consisting of platinum, iridium, rhodium, palladium, ruthenium, rhenium and osmium, the amount of platinum metal salt being sufficient, when converted to the oxide of the platinum metal, to be effective for carrying out electrolysis, contacting at least part of the surface of a core of a film forming metal with the solution, and subjecting the solution to conditions for causing a layer to be formed on the part of the surface of the core which contains, as a material effective for carrying out electrolysis, the oxide of the platinum metal, said step of contacting comprising contacting said surface of said core with sufficient solution for forming, during the subjecting of the solution to said conditions, a layer which is at least 0.054 micron thick.

34. A method as claimed in claim 33 in which the core metal is a metal taken from the group consisting of titanium, tantalum, zirconium and niobium and alloys of said metals.

35. A method as claimed in claim 34 comprising forming an oxide layer on said core metal prior to applying the oxide of the platinum metal.

36. A method as claimed in claim 35 in which the oxide layer is formed on the core metal thermally.

37. A method as claimed in claim 33 in which the step of forming the solution comprises forming a solution containing a salt of the platinum metal in an organic carrier, the step of contacting the surface of the core with the solution comprises coating the part of the surface of the core with the solution, and the step of subjecting the solution to conditions for causing the layer to be formed comprises heating the coated core in air to directly deposit the oxide of the platinum metal.

38. A method as claimed in claim 37 in which the core is titanium, and the platinum metal is palladium.

39. A method as claimed in claim 37 in which the core is tungsten and the platinum metal is ruthenium.

40. A method as claimed in claim 37 in which the core is tantalum and the platinum metals are palladium and iridium.

[ 41. A method as claimed in claim 33 in which the step of forming the solution comprises forming an electrolyte of a salt of the platinum metal, the step of contacting the surface of the core with the solution comprises inserting the core into the solution, and the step of subjecting the solution to conditions for causing the layer to be formed comprises carrying out electrolysis using the immersed core as an electrode in the electrolyte. ]

[ 42. A method as claimed in claim 41 in which the core is a metal taken from the group consisting of titanium and tantalum and the platinum metal is platinum. ]

43. A method as claimed in claim 33 in which the step of forming the solution comprises forming a solution of a salt of the platinum metal and the salt of a metal other than a platinum metal in an organic carrier, the step of contacting the surface of the core with the solution, and the step of subjecting the solution to conditions for causing the layer to be formed comprises heating the coated core in air to deposit directly the oxide of the platinum metal and the oxide of the metal other than the platinum metal.

44. A method as claimed in claim 43 in which the core is titanium and the platinum metal is iridium and the metal other than platinum metal is manganese.

45. A method as claimed in claim 43 in which the core is titanium and the platinum metal is platinum and the metal other than platinum metal is chromium.

* * * * *